No Printed Specification Available
3 Sheets-Sheet 1.
4180X
E. Clarke,
Locomotive.
Patented Sep. 9, 1825.
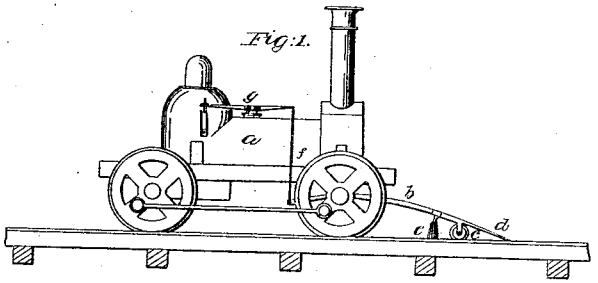
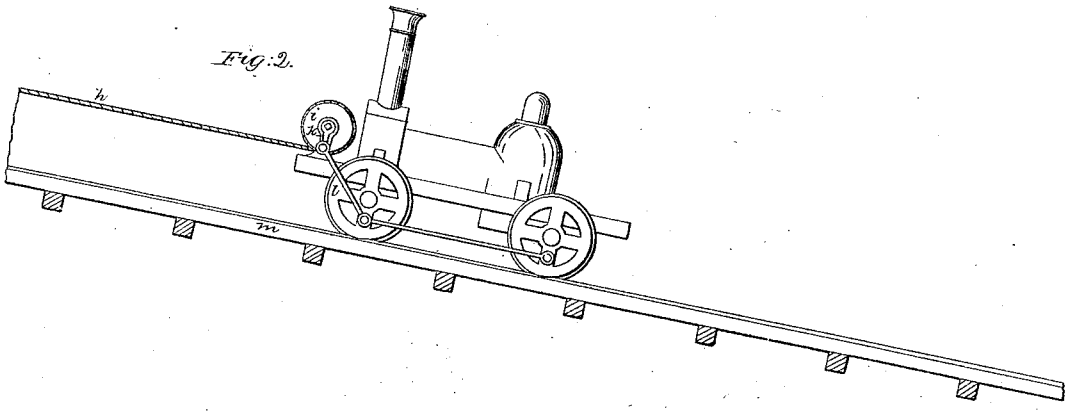
AM. PHOTO-LITHO. CO. N. Y. (OSBORNE'S PROCESS.)

3 Sheets-Sheet 2.
4180X
E. Clarke,
Locomotive.
Patented Sep. 9, 1825.
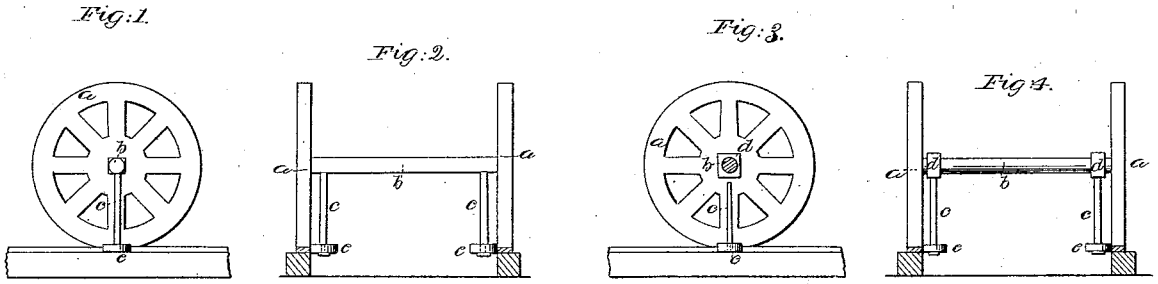
AM. PHOTO-LITHO. CO. N.Y. (OSBORNE'S PROCESS.)

3 Sheets-Sheet 3.
4180X
E. Clarke,
Locomotive.
Patented Sep. 9, 1885.
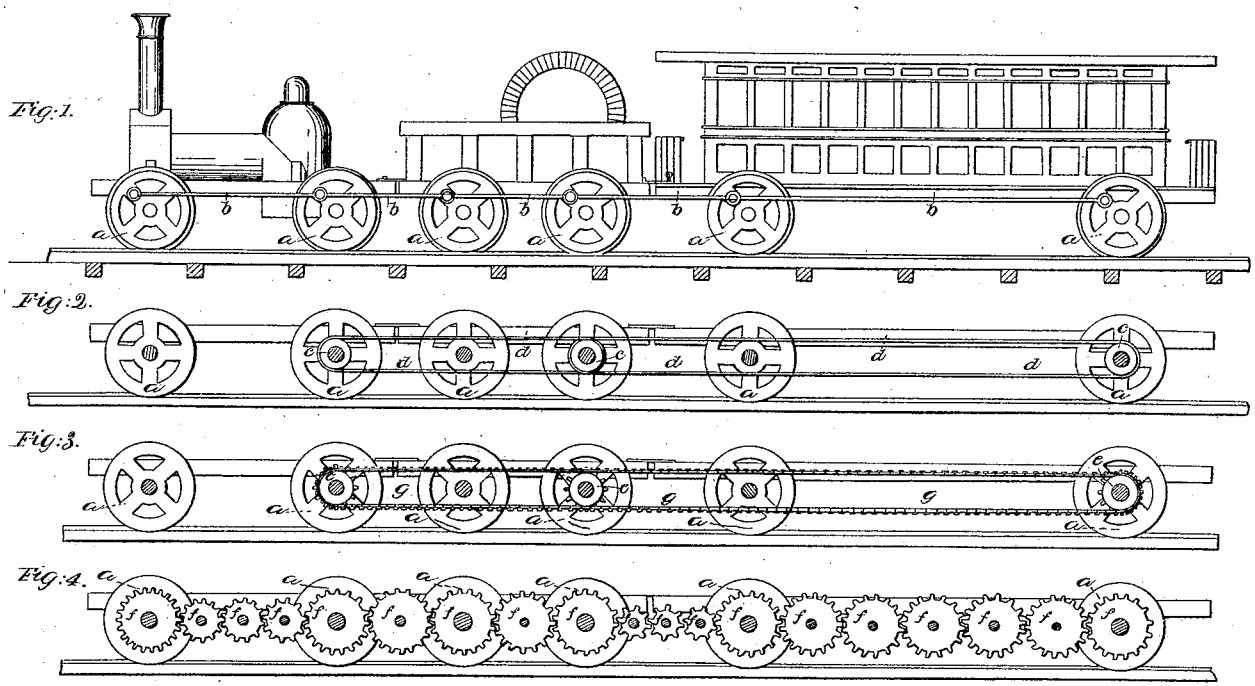
AM. PHOTO-LITHO. CO. N.Y. (OSBORNE'S PROCESS.)

MISSING PAGE TEMPORARY NOTICE

PATENT # 4180X FOR ISSUE DATE 9-9-1825

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text